United States Patent
Wietelmann

(10) Patent No.: US 8,846,879 B2
(45) Date of Patent: Sep. 30, 2014

(54) PROCESS FOR PRODUCING MIXED METAL RARE EARTH METAL HALIDE SOLUTIONS IN ORGANIC SOLVENTS

(75) Inventor: Ulrich Wietelmann, Friedrichsdorf (DE)

(73) Assignee: Chemetall GmbH, Frankfurt am Main (DE)

( * ) Notice: Subject to any disclaimer, the term of this patent is extended or adjusted under 35 U.S.C. 154(b) by 606 days.

(21) Appl. No.: 13/120,723

(22) PCT Filed: Oct. 7, 2009

(86) PCT No.: PCT/EP2009/062993
§ 371 (c)(1),
(2), (4) Date: Mar. 24, 2011

(87) PCT Pub. No.: WO2010/040761
PCT Pub. Date: Apr. 15, 2010

(65) Prior Publication Data
US 2011/0178337 A1    Jul. 21, 2011

(30) Foreign Application Priority Data

Oct. 8, 2008 (DE) .......... 10 2008 050 440

(51) Int. Cl.
*C07F 5/00* (2006.01)
*C01F 17/00* (2006.01)
*C07F 7/02* (2006.01)
*C08F 10/00* (2006.01)

(52) U.S. Cl.
CPC .......... *C01F 17/0056* (2013.01); *C01P 2006/80* (2013.01); *C01F 17/0068* (2013.01); *C08F 10/00* (2013.01); *C01P 2006/82* (2013.01)
USPC .............................. 534/15; 423/263; 556/410

(58) Field of Classification Search
CPC .............................. C07F 7/025; C01F 17/0056
USPC .............................. 534/15; 423/263; 556/410
See application file for complete search history.

(56) References Cited

U.S. PATENT DOCUMENTS

| | | |
|---|---|---|
| 6,121,429 A | 9/2000 | Balducci et al. |
| 7,737,232 B2 | 6/2010 | Lischka et al. |
| 2009/0326235 A1 | 12/2009 | Knochel et al. |

FOREIGN PATENT DOCUMENTS

| | | | |
|---|---|---|---|
| EP | 0 919 573 A1 | 6/1999 | |
| EP | 1 759 765 A1 | 3/2007 | |
| EP | 1759765 A1 | * 3/2007 | |
| WO | WO 2006/063755 A1 | 6/2006 | |

OTHER PUBLICATIONS

Krasovskiy, et al. "Soluble Lanthanide Salts (LnCl$_3$•2 LiCl) for the Improved Addition of Organomagnesium Reagents to Carbonyl Compounds", Angew. Chem. Int. Ed., 45 (2006), pp. 497-500.

* cited by examiner

*Primary Examiner* — Fereydoun G Sajjadi
*Assistant Examiner* — Kofi Adzamli
(74) *Attorney, Agent, or Firm* — Fulbright & Jaworski LLP

(57) ABSTRACT

The present invention relates to lithium salt-containing rare earth halide solutions in aprotic solvents, processes for production thereof and also use thereof.

15 Claims, No Drawings

PROCESS FOR PRODUCING MIXED METAL RARE EARTH METAL HALIDE SOLUTIONS IN ORGANIC SOLVENTS

RELATED APPLICATIONS

This application is a §371 application of PCT/EP20091062993 filed Oct. 7, 2009, which claims priority from German Patent Application No. 10 2008 050 440.8 filed Oct. 8, 2008.

Rare-earth halides ($SEHal_3$, where SE=scandium, yttrium, lanthanum and lanthanoids (Ce, Pr, Nd, Pm, Sm, Eu, Gd, Tb, Dy, Ho, Er, Tm, Yb, Lu) and Hal=Cl, Br or I) are used in anhydrous form as reagents in organic synthesis or they are used as starting compounds for the preparation of other SE compounds such as SE alkoxides or SE organyls. Thus, for example, the THF complex of neodymium chloride is used as a starting material to prepare allylneodymium compounds, which are used as catalysts for the stereospecific polymerization of butadiene (EP 0 919 573 B1; R. Taube et al., J. Organometal. Chem. 1 (513), 37-47, 1996).

Rare-earth halides can be prepared in a particularly elegant manner in an aprotic solvent by reacting rare-earth oxides with halogenating agents of the general formula

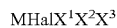

where
M=Si, Ge, Sn, Ti, Zr, Hf;
Hal=Cl, Br, I; and
$X^1$, $X^2$, $X^3$ independently of one another=Cl, Br, I, H, alkyl or aryl, it being possible for the alkyl or aryl radicals to carry one or more other halogen substituents selected from the group comprising F, Cl, Br and I (WO 2006/063755 A1).

In this process the rare-earth halide is formed as a solid (as a solid solvate complex when using solvating solvents like THF), while the metal part of the halogenating agent $MHalX^1X^2X^3$ is normally obtained in liquid or dissolved form. This is illustrated by the following reaction scheme:

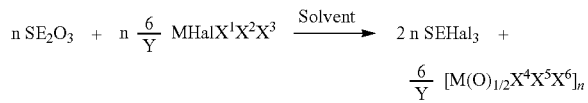

where Y is the number of halide atoms in the halogenating agent $MHalX^1X^2X^3$, n represents the degree of polymerization of the reaction product $[M(O)_{1/2}X^4X^5X^6]$ and $X^4$, $X^5$ and $X^6$ denote $(O)_{1/2}$ in the case where $X^1$ and/or $X^2$ and/or $X^3$ in $MHalX^1X^2X^3$ are halide, or they have the same meaning as $X^1$ and/or $X^2$ and/or $X^3$ in the case where these are not halide in $MHalX^1X^2X^3$.

Rare-earth halides are only poorly soluble in the solvents or solvent mixtures used, so the rare-earth halide can be isolated pure in solid form, usually as a solvate with the polar aprotic solvent used, by solid/liquid separation.

For example, the reaction of $La_2O_3$ with $SiCl_4$ in THF yields the complex $LaCl_3.2$ THF, which is only sparingly soluble in THF (ca. <1%, based on $LaCl_3$) and can be filtered in crystalline form from the solvent and the $SiO_2$ sol formed as by-product and—depending on the exact reaction and work—up conditions—can be isolated with yields of between ca. 60 and 90%.

Rare-earth metal salts are often used to activate carbonyl compounds or imine derivatives for the 1,2-addition of metal-organdc reagents (S. Kobayashi, M. Sugiura, H. W. L. Lam, Chem. Rev. 2002, 35, 209). This can be done using the rare-earth metal salts, e.g. cerium chloride, in solid form (T. Imamoto, Y. Sugiyura, N. Takiyama, Tetrahedron Lett. 1984, 25, 4233). However, this process suffers from disadvantages attributable to unfavourable properties of the solid rare-earth metal salts. In the first place the solids are extremely hygroscopic, so they have to be handled under rigorous inert gas conditions, which, in the case of solids, especially on the industrial scale, is not easy or necessitates expensive technical precautions (solids lock and solids metering system). The entrainment of water must be avoided at all costs because the metal-organic reagents used (mostly Grignard compounds or organolithium compounds) are extremely water-sensitive. Furthermore, rare-earth halides are soluble in the fewest solvents of all. Imamoto's reactions are therefore heterogeneous, resulting in poor mixing and often unsatisfactory chemical yields in the 1,2-addition. P. Knochel et al. found a substantial improvement to Imamoto's process: the solubility of rare-earth metal salts can be markedly increased by adding lithium salts, especially lithium chloride (A. Krasovskly, F. Kopp, P. Knochel, Angew, Chem 2006, 118, 522-5). Consequently, the desired organometallic reactions can be carried out in the homogeneous phase and the yields are normally better. Also, the handling of rare-earth halide/lithium salt solutions (e.g. $LaCl_3.2$ LiCl in THF) is considerably simplified. One disadvantage, however, is the laborious preparation of the rare-earth halide/lithium salt solutions, which is the subject of EP 1759765 (LMU 2005), The process for the preparation of rare-earth chloride/lithium salt solutions, e.g. a solution of $LaCl_3.2$ LiCl in THF, involves mixing commercially available rare-earth chloride hydrate (e.g. $LaCl_3.6H_2O$) with 2 mol equivalents of LiCl, dissolving the mixture in water and stirring the resulting solution or suspension, initially at PT, for 4 h under high vacuum conditions. The temperature is then raised in steps to 40, 60, 80, 100, 120, 140 and finally 160° C., with a residence time of 4 h at each of the said temperature levels. This slow heating is essential to prevent hydrolysis of the rare-earth chloride, which would give rise to insoluble hydrolysis products (inactive in subsequent organic reactions). The drying time in the indicated process is thus 8×4=32 hours. Such a tedious process naturally has a high cost associated with it.

Another disadvantage is that the water content of the resulting salt is still too high to allow it to be used directly as an additive for metal-organic reactions, so the product prepared as described is dried again with a molecular sieve after being dissolved in organic solvents, e.g. THF. The additional cost of the molecular sieve makes the process more expensive. In addition, a filtration step is required and a significant amount of product is adsorbed on to the molecular sieve, resulting in losses of yield.

The object of the present invention was therefore to provide the simplest and most cost-effective process possible for the preparation of solutions of rare-earth metal salts mixed with lithium salts in solvents that are inert towards organometallics. This process should
 start from low-cost raw materials that are readily available,
 be able to be carried out in simple plants and apparatuses,
 afford a high space/time yield and
 give directly an anhydrous solution of the desired rare-earth metal halide/lithium salt mixture.

Surprisingly, the object is achieved according to the invention by reacting rare-earth metal oxides with halogenating agents of the general formula

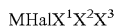

where
M=Si, Ge, Sn, Ti, Zr or Hf;
Hal=Cl, Br or I; and
$X^1$, $X^2$, $X^3$ independently of one another=Cl, Br, I, H, alkoxide (—OR), R being an organic radical having 1-20 C atoms, alkyl having 1-20 C atoms or aryl having 6-20 C atoms, it being possible for the alkyl or aryl radicals to carry one or more other halogen substituents selected from the group comprising Cl, Br and I, in a polar aprotic solvent in the presence of a lithium salt LiY. Y denotes Hal, $SO_4/2$, ON, SON, NCO, $HalO_n$ (n=3 or 4), $NO_3$, $BE_4$ or $PF_6$, Hal being selected from the group comprising Cl, Br and I.

Examples of preferred halogenating agents according to the invention are the metal tetrahalogen compounds $MHal_4$ (M and Hal as defined above); arylmetal halides such as $C_6H_5MHal_3$; hydridometal halides such as $HMHal_3$; halogen-functionalized arylmetal halides such as $C_6H_4HalMHal_3$, where $C_6H_4Hal$=e.g. 4-chloro-, bromo- or iodophenyl; and alkylmetal halides, particularly preferably methylmetal halides such as $(H_3C)MHal_3$, $(H_3C)_2MHal_2$, $(H_3C)_3MHal$, $(H_3C)_2MClCH_2Hal$ or mixtures thereof.

Particularly preferred halogenating agents are: $SiCl_4$, $SiBr_4$, $GeCl_4$, $SnCl_4$, $TiCl_4$, $TiBr_4$, $C_6H_5SiCl_3$, $4\text{-}ClC_6H_4SiCl_3$, $4\text{-}BrC_6H_4SiCl_3$, $HSiCl_3$, $(H_3C)_2ClSiCH_2Cl$, $(H_3C)_2ClSiCH_2Br$, $(H_3C)SiCl_3$, $(H_3C)_2SiCl_2$, $(H_3C)_3SiCl$. $SiCl_4$ and $SiBr_4$ are very particularly preferred.

Many of these halogenating agents, e.g. $SiCl_4$, $TiCl_4$ and many alkylsilicon chlorides, are commercially available in industrial quantities and can be used for the process according to the invention without further pretreatment.

The molar ratio of the rare-earth oxide $SE_2O_3$ to the metal halogen compound $MHalX^1X^2X^3$ is as follows:

ca. 1:6 for $X^1$, $X^2$, $X^3 \neq$Hal
ca. 1:3 for $X^1$=Hal, $X^2$, $X^3 \neq$Hal
ca. 1:2 for $X^1$, $X^2$=Hal, $X^3 \neq$Hal
ca. 1:1.5 for $X^1$, $X^2$, $X^3$=Hal.

To achieve as complete a reaction as possible, the metal-halogen compound can also be used in excess, preferably in 1-50% excess.

The reaction stoichiometry is illustrated by the following example. If a tetrahalogen compound is chosen as the halogenating agent (i.e. if $X^1$, $X^2$ and $X^3$=Hal), the equation takes the following form:

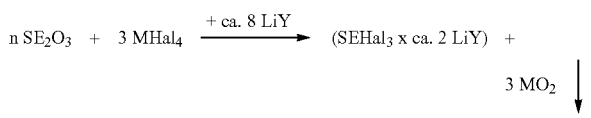

Suitable polar aprotic solvents are ether compounds that are either
open-chain such as $R^1$—O—$R^2$ (where $R^1$ and $R^2$ independently of one another are alkyl or aryl having 1-8 C atoms); or
a cyclic such as

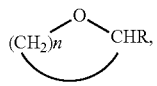

where n=3 or 4 and R=H or alkyl having 1-8 C atoms; or
polyfunctional like R—O(—$CH_2$—$CH_2$)$_n$—OR', where P and R' independently of one another are alkyl radicals having 1-8 C atoms and n=1-100,
either pure or in a mixture. Particularly preferably, the ether solvent used can be e.g. tetrahydrofuran, tetrahydropyran, 2-methyltetrahydrofuran, dimethyl ether, diethyl ether, methyl tert-butyl ether, 1,2-dimethoxyethane or a mixture of two or more of the said solvents.

The following polar aprotic solvents can also be used in certain cases:
esters, e.g. carboxylic acid esters such as ethyl acetate, γ-butyrolactone, methyl benzoate, or carbonic acid esters such as dimethyl carbonate, diethyl carbonate, propylene carbonate, ethylene carbonate, or mixtures thereof
ketones, e.g. acetone, propiophenone
amides, e.g. N-methylpyrrolidone, dimethylacetamide, dimethylpropyleneurea (DMPU)
nitriles, e.g. acetonitrile, butyronitrile
halogen-free sulfur compounds, e.g. dimethyl sulfoxide, tetrahydrothiophene
tertiary amines, e.g. triethylamine, tetramethylethylenediamine The said solvents are not universally applicable when the process products according to the invention are to be used for organometallic transformations, since they are attacked e.g. by magnesium and lithium oraanyls.

If appropriate, one or more hydrocarbons, e.g. alkanes or aromatics, can be added to the polar aprotic solvents in a weight ratio solvent:hydrocarbon of 1:5 (maximum).

The rare-earth oxides used are the compounds $SE_2O_3$, where SE=Sc, Y, La, Ce, Pr, Nd, Pm, Sm, Eu, Gd, Tb, Dy, Ho, Er, Tm, Yb or Lu, generally in commercially available form, They are preferably used as powders and in anhydrous form, i.e. with $H_2O$ contents<0.5%. It is particularly preferable to use $Nd_2O_3$, $Sm_2O_3$ or $La_2O_3$.

The anion Y of the lithium salt LiY is preferably selected from Hal, $SO_4/2$, CN, SCN, NCO, $HalO_n$ (n=3 or 4), $NO_3$, $BF_4$ and $PF_6$. Hal denotes halogen (Cl, Br, I), LiCl, LiEr, LiI or mixtures thereof are very particularly preferred. The molar ratio of lithium salt. LiY to rare-earth metal SE is between 0.1 and 5, preferably between 0.5 and 4 and very particularly preferably between 1.0 and 3.0.

The general preparative process proceeds as follows: the rare-earth metal oxide and the lithium salt in the aprotic solvent or solvent mixture are placed in an inertized reaction vessel (=anhydrous vessel, filled with inert gas). The halogenating agent is then metered into the stirred suspension. The preferred reaction temperature depends on the reactivity of the particular combination of raw materials. The working range is generally between −20° C. and ca. 100° C., preferably between 0 and 80° C. The halogenating agent is metered in over a period of ca. 10 minutes to 5 hours, preferably of 0.5 to 3 hours. When the metering has ended, it is possible to continue the reaction for some time, with stirring, particularly preferably at elevated temperatures, in THF, e.g. under reflux conditions (ca. 66° C.)

Under the chosen conditions the rare-earth metal halide goes immediately into solution in the form of a complex with the lithium salt. For example, in the reaction of neodymium oxide with silicon tetrachloride in THF in the presence of ca. 2 eq. of lithium chloride, a solution of $NdCl_3 \cdot 2$ LiCl forms immediately. It was found, surprisingly, that the chlorine-containing silicon oxide formed as by-product, with the approximate composition $Si_{3.5}O_6Cl_2$, is obtained in insoluble form, so the solution containing neodymium chloride can be isolated pure, i.e. without contamination by Si-containing by-products. This is contrary to the behaviour in the reaction mixture free of lithium salt, in which the Si by-product remains in solution or, after storage, deposits in the form of a gel that cannot immediately be separated off (cf. Example 1 of POT/EP 2005/013285). When using silicon tetrachloride, the contents of such interfering impurities (soluble SiO-containing compounds) are <100 µmol/g solution, preferably <50 µmol/g solution and particularly preferably <25 µmol/g solution. The content of soluble SiO-containing interfering substances can be determined by titration with n-butyllithium solution.

When using metal tetrahalogen compounds, the solutions prepared according to the invention that contain rare-earth metal and lithium can be completely separated by a simple solid/liquid separation, e.g. filtration, centrifugation or decantation, from the insoluble Si-containing accompanying products, since the metal oxide by-products are generally obtained in insoluble form.

The concentration of the rare-earth metal halide in the product solutions according to the invention depends on the particular solvent used, the molar ratio lithium salt:rare-earth metal halide and the rare-earth metal halide itself. In THF as solvent, preferred rare-earth metal concentrations for a molar ratio LiY:SEHal$_3$ of 1:1 to 3:1 are between about 5 and 30 wt. %, particularly preferably between 10 and 20 wt. %.

It was also found that, surprisingly, the water contents of the product solutions prepared according to the invention (measured by Karl Fischer titration) are extremely low. In general, the water contents are <200 ppm and preferably <100 ppm, so an expensive after-drying of the products prepared according to the invention is superfluous. Thus an expensive after-treatment (e.g. drying with a molecular sieve) is no longer necessary in order to be able to use the product solutions according to the invention for organometallic reactions.

The product solutions prepared according to the invention can be used as such for a variety of organic reactions. They are very particularly suitable as selectivity-improving additives in 1,2-additions of organometallic compounds (e.g. magnesium and lithium organyls) on to carbonyls or imines.

The invention is illustrated by the Examples which follow:

EXAMPLE 1

Preparation of 15% Solution of LaCl$_3$.2 LiCl in THF by Reacting La$_2$O$_3$/4LiCl with SiCl$_4$ in THF 479 q of lanthanum oxide, 262 g of LiCl powder (water content 800 ppm) and 3800 g of tetrahydrofuran (water content 130 ppm) were placed in a dried 6 l jacketed reactor filled with argon protective gas. The internal temperature was adjusted to ca. 60° C., with stirring, and 410 g of SiCl$_4$ were then metered in uniformly over 2.5 hours. The internal temperature was between 65 and 67° C. throughout the metering phase, i.e. the reaction mixture (a white suspension) refluxed gently.

When the addition had ended, the jacket temperature was raised to 80° C. and the mixture was refluxed for 2 h. After this time the white suspended solid appeared compact and had sedimented well. After being cooled to RT, the suspension was run through a pressure filter.

The filtration lasted about half an hour and gave 3.7 kg of an almost colourless, clear filtrate. The filter cake was subsequently washed with a total of 1.99 kg of THF, divided into three portions, and then vacuum-dried at room temperature for 2.5 h, with occasional stirring. The dried filter residue was snow-white and barely pulverulent.

The experimental results and analyses are collated in the table below:

| | Analysis | | | | | | |
|---|---|---|---|---|---|---|---|
| | Amount (g) | La (mmol/g) | Li (mmol/g) | Cl (mmol/g) | H$_2$O (ppm) | Fe (ppm) | BuLi titration (µmol/g) |
| Primary filtrate | 3740 | 0.60* | 1.27 | 3.06 | 41 | 14 | 15 |
| Wash filtrate | 2133 | 0.235 | 0.49 | 1.20 | 20 | 9 | 4 |
| Filter residue | 530 | 0.18 | 0.36 | 2.98 | n.d. | 45 | n.d. |

*14.7 wt. % of LaCl$_3$
n.d. = not determined

The product solution, containing almost 15 wt. % of LaCl$_3$, has a molar ratio LiCl:LaCl$_3$ of 2.1, a very low water content of 41 ppm and also a very low content of interfering substances (1.5 µmol/g), determined by titration with n-butyllithium.

Yield: 550 g of LaCl$_3$ content
76% of theory in primary filtrate; 93% of theory in all filtrates

EXAMPLE 2

Determination of the Interfering Impurities by Titration with n-butyllithim

About 10 g of the lanthanum chloride solution prepared according to Example 1 are injected into a thoroughly heated, inertized vessel equipped with a septum and a magnetic stirrer bar. After the addition of a few drops of 1,10-phenanthroline solution, ca. 5% n-butyllithium solution is added dropwise, with stirring, until the colour changes from colourless to violet.

By this procedure the content of interfering substances was determined as 15 µmol/g.

The invention claimed is:
1. A process for the preparation of an anhydrous rare-earth halide of the formula SEHal$_3$, wherein SE is Sc, Y, La, Ce, Pr, Nd, Pm, Sm, Eu, Gd, Tb, Dy, Ho, Er, Tm, Yb or Lu; and Hal is Cl, Br or I, comprising the steps of
   reacting a rare-earth oxide SE$_2$O$_3$ in a polar aprotic solvent with a halogenating agent of formula MHalX$^1$X$^2$X$^3$ in the presence of a lithium salt LiY,
   wherein M is Si, Ge, Sn, Ti, Zr or Hf;
   Hal is as defined above;
   X$^1$, X$^2$ and X$^3$ are independently of one another Cl, Br, I, H, alkoxide of formula —OR, wherein R is an organic radical having 1 to 20 C atoms, alkyl having 1-20 C atoms or aryl having 6-20 C atoms, wherein the alkyl or aryl radical can be substituted with a halogen selected from the group comprising Cl, Br and I,
   and Y is Hal, SO$_4$, SO$_2$, CN, SCN, NCO, HalO$_n$ wherein n is 3 or 4, NO$_3$, BF$_4$ or PF$_6$, wherein Hal is as defined above,
   to form the anhydrous rare-earth halide of the formula SEHal$_3$.
2. A process according to claim 1, wherein the molar ratio of the rare-earth oxide SE$_2$O$_3$ to the metal halogen compound MHalX$^1$X$^2$X$^3$ is as follows:
   ca. 1:6 for X$^1$, X$^2$, X$^3$ ≠Hal
   ca. 1:3 for X$^1$=Hal, X$^2$, X$^3$ ≠Hal
   ca. 1:2 for X$^1$, X$^2$=Hal, X$^3$ ≠Hal
   ca. 1:1.5 for X$^1$, X$^2$, X$^3$=Hal.

3. A process according to claim 1, wherein the metal-halogen compound is present in excess.

4. A process according to claim 1, wherein the molar ratio of lithium salt LiY to rare-earth metal SE is between 0.1 and 5.

5. A process according to claim 1, wherein the lithium salt LiY is at least one member selected from the group consisting of lithium chloride, lithium bromide and lithium iodide.

6. A process according to claim 1, wherein the polar aprotic solvent comprises at least one ether selected from the group consisting of an open-chain polyfunctional ether, a cyclic polyfunctional ether and a monofunctional ether.

7. A process according to claim 1, wherein the aprotic solvent comprises at least one liquid selected from the group consisting of an ether, an ester, a ketone, an amides, a nitrile, a halogen-free sulfur compound and a tertiary amines.

8. A process according to claim 1, wherein the reaction is carried out in a mixture comprising the solvent and a hydrocarbon, wherein the solvent is an ether.

9. A process according to claim 1, wherein the reaction is carried out in a mixture of a liquid comprising a hydrocarbon and at least one member selected from the group consisting of an ether, an ester, a ketone, an amide, a nitrile, a halogen-free sulfur compound and tertiary amine.

10. A process according to claim 9, wherein an aromatic solvent selected from the group comprising benzene, toluene, ethylbenzene, cumene and xylene, or an alkane selected from the group comprising pentane, hexane, cyclohexane, methylcyclohexane, heptane and octane, is preferably used as the hydrocarbon.

11. A process according to claim 1, wherein the ether solvent comprises at least one member selected from the group consisting of tetrahydrofuran, tetrahydropyran, 2-methyltetrahydrofuran, dimethyl ether, diethyl ether, methyl tert-butyl ether and 1,2-dimethoxyethane.

12. A process according to claim 1, wherein the reaction is conducted at a temperature of between −20 and +100° C.

13. A process according to claim 1, wherein the halogenating agent comprises at least one member selected from the group consisting of a metal tetrahalogen compound of formula $MHal_4$; an arylmetal halide; a hydridometal halide and a halogen-functionalized arylmetal halide.

14. A process according to claim 1, wherein the halogenating agent is selected from the group consisting of $SiCl_4$, $SiBr_4$, $GeCl_4$, $SnCl_4$, $TiCl_4$, $TiBr_4$, $C_6H_5SiCl_3$, $4\text{-}ClC_6H_4SiCl_3$, $4\text{-}BrC_6H_4SiCl_3$, $HSiCl_3$, $(H_3C)_2ClSiCH_2Cl$, $(H_3C)_2ClSiCH_2Br$, $(H_3C)SiCl_3$, $(H_3C)_2SiCl_2$ and $(H_3C)_3SiCl$.

15. A process according to claim 1, wherein the rare-earth oxide is selected from the group consisting of $Nd_2O_3$, $Sm_2O_3$ and $La_2O_3$.

* * * * *